June 2, 1936.  C. KNOBLOCH  2,042,471
LIQUID LEVEL GAUGE
Filed Sept. 11, 1933   2 Sheets-Sheet 1
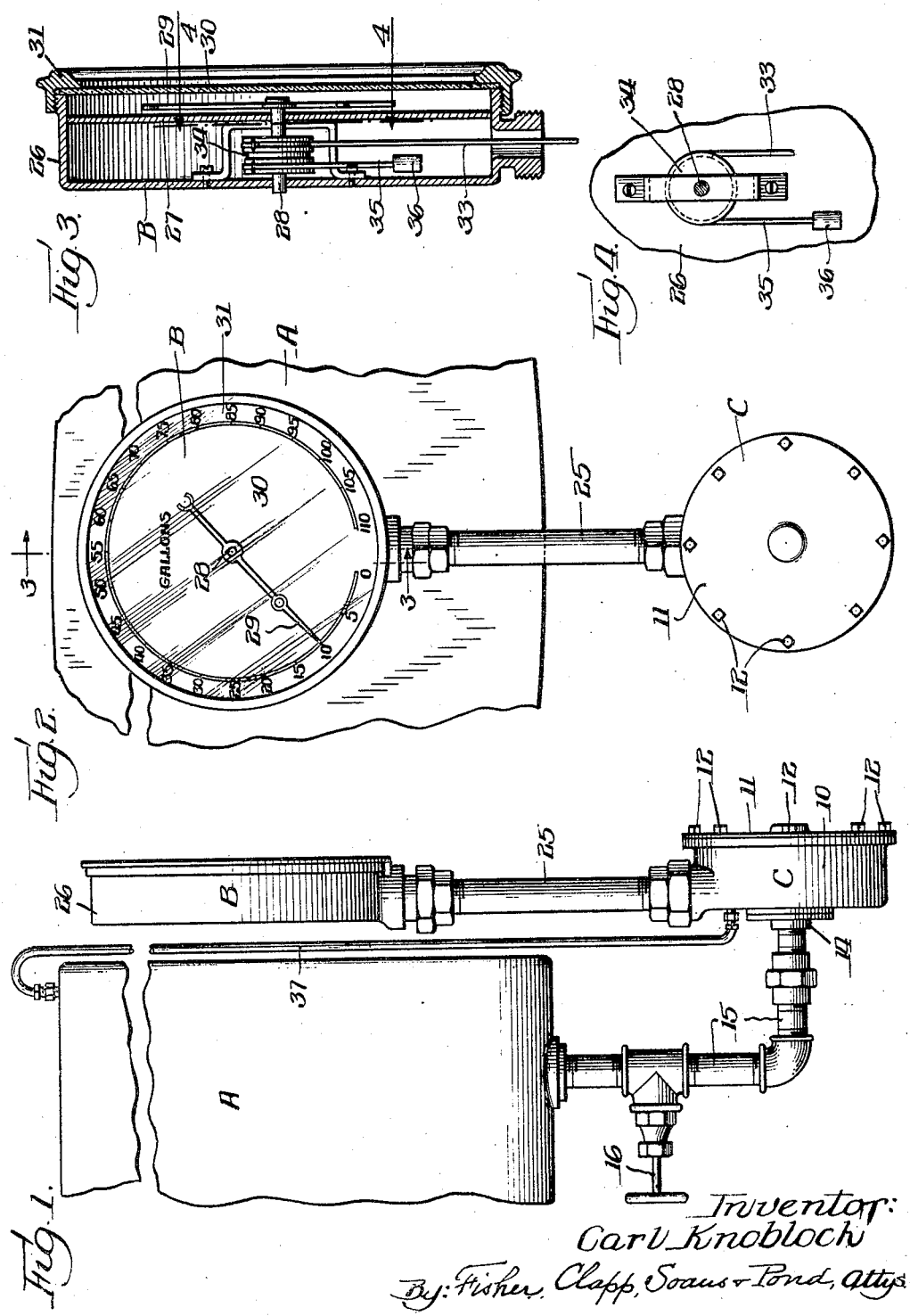
Inventor:
Carl Knobloch
By: Fisher, Clapp, Soans & Pond, Attys June 2, 1936.  C. KNOBLOCH  2,042,471
LIQUID LEVEL GAUGE
Filed Sept. 11, 1933  2 Sheets-Sheet 2
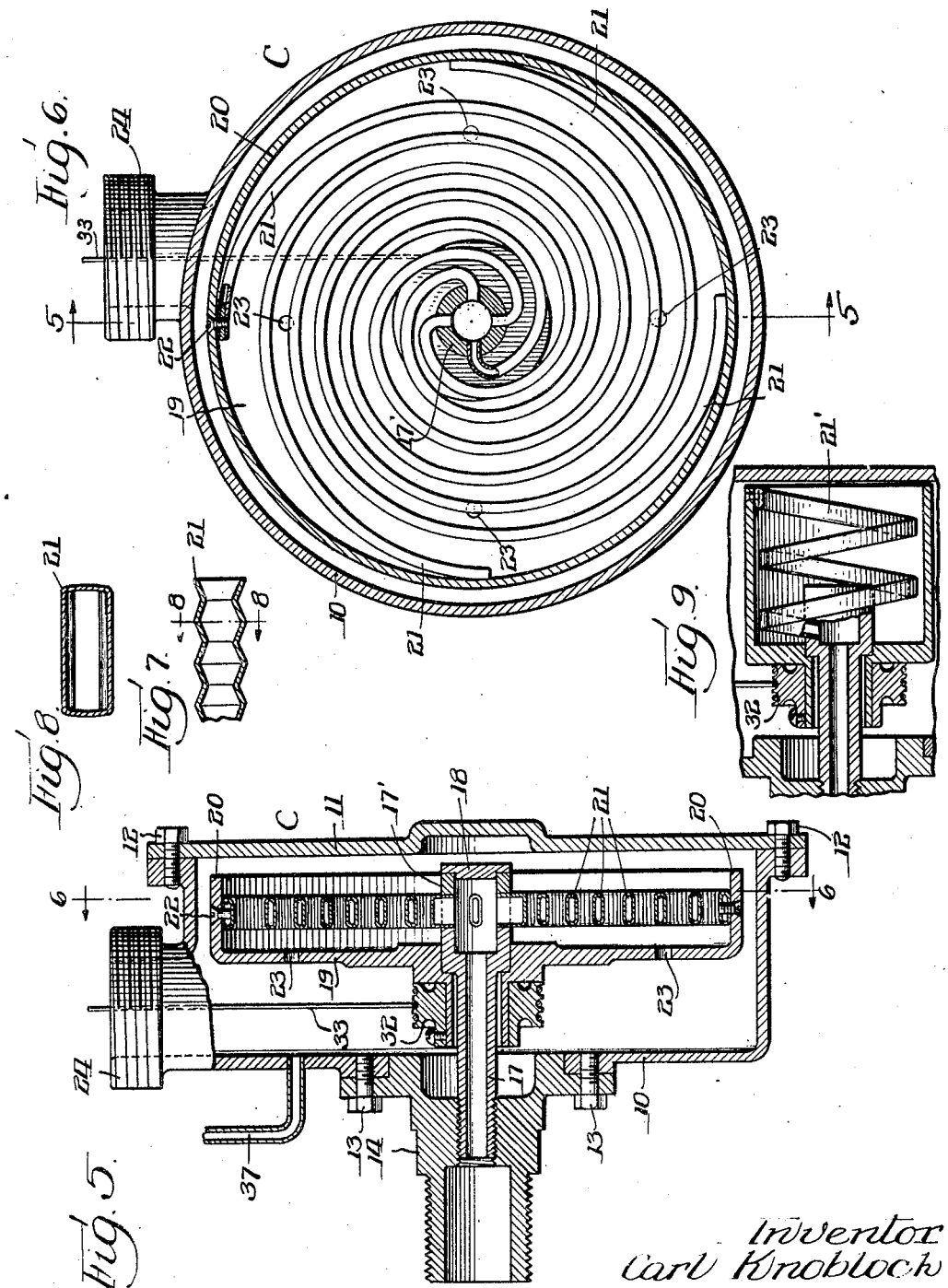
Inventor
Carl Knobloch
By Fisher, Clapp, Soans & Pond, Attys.

Patented June 2, 1936

2,042,471

UNITED STATES PATENT OFFICE 2,042,471

LIQUID LEVEL GAUGE

Carl Knobloch, Akron, Ohio

Application September 11, 1933, Serial No. 688,924

8 Claims. (Cl. 73—54)

This invention relates to that type of gauges which are designed for use in association with liquid containers, such, for examples, as gasoline, oil, and water tanks, to indicate the volume of liquid in the tank at all times. Such gauges are especially useful on automobiles to show the driver at a glance the supply of gasoline he has on hand, and in filling stations to disclose the condition of storage tanks.

Numerous patents have heretofore been granted to me and to others on liquid volume gauges for these purposes based on the principle of a diaphragm mounted on or in the tank containing the liquid and subjected on one side to the hydrostatic pressure of the liquid in the tank and on its opposite side to a uniform pressure, such as that of the atmosphere, a visual indicator, and a mechanical connection between the diaphragm and indicator. These are generally known as "diaphragm" gauges; and, while their indications are in the main reliable and satisfactory, yet, owing to an unavoidable degree of inherent stiffness in the diaphragms, the large size required to get sufficient movement and for other causes, they are not as sensitive and do not afford as perfect accuracy as is desirable. Furthermore, the manufacture of the diaphragms is a very delicate and expensive operation.

The main object of my present invention is to improve and increase the sensitiveness, accuracy and reliability of liquid volume gauges, and also to reduce the cost, and to this end my present improved gauge dispenses with the diaphragm heretofore employed, and uses, in lieu thereof one or more Bourdon tubes that are interiorly subjected directly to the hydrostatic pressure of the liquid to be measured and that in turn, through their tendency to straighten or unwind when subjected to internal liquid pressure, impart movement to the pointer or other movable member of the indicator.

One practical and workable embodiment of the present invention is illustrated in the accompanying drawings, although it is to be understood that the details of structure and arrangement therein shown may be widely varied without involving any departure from the operative principle or sacrificing any of the advantages secured thereby.

In the drawings—

Fig. 1 is a side elevation of the gauge shown applied to a liquid tank, the latter being shown fragmentarily and broken out between its top and bottom.

Fig. 2 is a front or face elevation of the same.

Fig. 3 is a vertical axial section through the indicator.

Fig. 4 is a detail view of a portion of the indicator, in section on the line 4—4 of Fig. 3.

Fig. 5 is a vertical axial section through the indicator actuator that is directly subjected to the hydrostatic pressure of the liquid in the tank, taken on the line 5—5 of Fig. 6.

Fig. 6 is a vertical transverse section of the same, taken on the line 6—6 of Fig. 5.

Figs. 7 and 8 are longitudinal and transverse sections, enlarged, showing a preferred corrugated form of Bourdon tube.

Fig. 9 is a sectional detail, showing the use of a Bourdon tube of helical or screw form.

Referring to the drawings, A designates as an entirety a liquid container, such as a gasoline or oil tank, B designates as an entirety an indicator, herein shown as of the dial type, and C designates as an entirety an indicator actuator that is subject to and operated by the hydrostatic pressure of the liquid in the container A.

First describing the indicator actuator shown in detail in Figs. 5 and 6, 10 designates the body member of a casing, the open side of which may be closed by a lid or cover 11 attached thereto by suitable machine screws 12. Secured to the rear side of the casing body 10, as by machine screws 13, is a flanged nipple 14 that, as shown in Fig. 1, communicates with the bottom of the tank A by a pipe 15 equipped with a suitable shut off valve 16. Screwed into the nipple 14 and extending into the casing 10 is a hollow arbor 17, preferably formed with an enlarged inner end 17' closed by a cap 18. Mounted to turn on the arbor 17 is a rotor preferably taking the form of a disc 19 having a peripheral flange 20 that encircles the enlarged inner end 17' of the arbor.

21 designates each of a plurality of independent Bourdon tubes that at their inner ends are secured in and communicate with the enlarged end 17' of the hollow arbor, and at their outer ends are attached, as by screws 22, to the flange 20 of the rotor. A single Bourdon tube may be used, but preferably I employ a plurality uniformly spaced around the arbor and the flange of the rotor. Where four such tubes are employed, as herein shown, they may all be inter-nested and located in a common plane, as shown in Figs. 5 and 6, or they may be located side by side. The disc 19 of the rotor is preferably formed with a plurality of holes 23, for a purpose later explained.

The body 10 of the casing is formed on its upper end with a threaded hollow boss 24, to which is suitably connected a pipe 25 that, in turn, is suitably connected into the lower end of a dial casing 26, forming the body member of the indicator B. This dial indicator may be of ordinary construction, including a dial plate 27 calibrated in gallons or other indicia, an arbor 28, a pointer 29 overlying the dial plate 27, a crystal 30 and a clamping ring 31. By means of pipe 25, the indicator B is supported from the indicator actuator C, or it might be independently supported.

Referring to Fig. 5, fast on the hub of the rotor disc 19 is a grooved pulley 32, to which is attached a cord 33 that extends upwardly through the pipe 25 and at its upper end is attached to a grooved pulley 34 (Fig. 3) fast on the arbor 28 of the indicator. Also attached to the pulley 34 and depending from the opposite sides thereof from the cord 33 is a cord 35 supporting a weight 36.

The operation of the gauge is probably obvious from the foregoing description of its structure, but may be briefly described as follows.

When the tank A is filled with liquid, the latter flows down through the pipe 15, the nipple 14, the hollow arbor 17, into and filling the Bourdon tubes 21 which latter, of course, are closed at their outer ends. The hydrostatic pressure tends to unwind or straighten the Bourdon tubes, under the well understood principle of the latter, and this imparts a limited turning movement to the rotor 19, which, in the arrangement shown in Fig. 6, is in a clockwise direction. This movement is transmitted through the pulley 32, cord 33, pulley 34 and arbor 28 to the pointer 29, moving the latter to a point on the scale showing the number of gallons in the tank A. As the liquid in the tank is drawn off, the hydrostatic pressure of course decreases, and the Bourdon tubes, tending to resume their normal position, turn the rotor backwardly or in a contra-clockwise direction as shown in Fig. 6, and the weight 36 acting through its cord 35 on the pulley 34, tends to both return the pointer towards zero position, and also maintains a sufficient tension on the cord 33 to keep the latter taut. Of course, a spring might be used in place of weight 36.

The Bourdon tubes 21 may be made of any metal of an elastic or springy character, such as phosphor bronze, tempered brass or copper, or thin steel, so that, under the influence of internal pressure they tend to unwind or straighten, and, when the pressure is relieved or reduced, they tend to return to normal position. Preferably the tubes are transversely corrugated, as best shown in Figs. 7 and 8 to give greater flexibility. These tubes are very sensitive to slight variations in internal pressure, being, in fact, much more sensitive than the bellows diaphragms heretofore quite generally used in gauges of this type, and hence afford more accurate and reliable scale readings. In Fig. 9 I show a modified form of Bourdon tube that may be used, consisting of one or more tubes 21' of helical or screw form.

This improved gauge has the advantage that it automatically takes care of variations in the height of gasoline in the tank due to expansions and contractions under variations in temperature, the scale having been calibrated empirically by test with the liquid at, say 60° F. Variations in the volume caused by expansion when the temperature rises above that point, or contraction when the temperature falls below that point do not affect the hydrostatic pressure existing in the Bourdon tubes, and consequently the dial needle remains stationary under temperature changes.

With the tank partially filled with gasoline, vapors are constantly being generated, which, accumulating in the closed top of the tank, create some pressure on the surface of the liquid, which is in addition to the hydrostatic pressure; and to prevent a slightly inaccurate reading of the indicator due to this cause, I connect the top of the tank with the interior of the actuator casing by an open pipe connection 37 (Fig. 1), which equalizes the gas pressure at all times existing in the tank and in the casing of the actuator. The holes 23 in the rotor facilitate the access of these pressure changes to all sides of the Bourdon tubes, so that the differential internal pressures on the outer and inner sides of the Bourdon tubes remain constant; any slight changes of internal pressure due to variations in vapor pressure on the liquid in the tank being neutralized by correspondingly increased or decreased external gas pressures acting on the outer surfaces of the tubes.

I claim:

1. In a gauge of the character described, the combination of a fixed hollow arbor closed at one end and at its other end adapted for connection to a liquid container, a rotor journaled on said arbor, a Bourdon tube at its inner end attached to and communicating with said arbor and at its outer end attached to said rotor, an indicator, and operating connection between said rotor and said indicator.

2. In a gauge of the character described, the combination of a casing, a fixed hollow arbor having a closed inner end extending into said casing, a rotor journaled on said arbor within said casing, a Bourdon tube at its inner end communicating with said arbor and at its outer end attached to said rotor, an indicator located outside said casing, operating connections between said rotor and said indicator, and means providing communication of the outer end of said arbor with a liquid container.

3. In a gauge of the character described, the combination of a fixed tube closed at one end and at its other end adapted for connection to a liquid container, a rotor coaxial with said tube, a plurality of independent Bourdon tubes at their inner ends communicating at circumferentially spaced points with said tube and at their outer ends attached at circumferentially spaced points to said rotor, an indicator, and operating connections between said rotor and said indicator.

4. In a gauge of the character described, the combination of a fixed tube closed at one end and at its other end adapted for connection to a liquid container, a rotor coaxial with said tube, a plurality of independent inter-nested Bourdon tubes disposed in a common plane with their inner ends communicating at circumferentially spaced points with said tube and their outer ends attached at circumferentially spaced points to said rotor, an indicator, and operating connections between said rotor and said indicator.

5. In a gauge of the character described, the combination of a fixed hollow arbor closed at one end and at its other end adapted for connection to a liquid container, a rotor mounted on said arbor comprising a disc having a peripheral flange, one or more Bourdon tubes, each tube at its inner end communicating with said arbor and at its outer end attached to said flange, an indicator, operating connections between said rotor and said indicator, and means providing communication of the other end of said arbor with a liquid container.

6. The combination with a tank, of means for registering the amount of liquid in said tank, comprising an indicator, an indicator actuator of the Bourdon type located below said tank, a casing enclosing said actuator, a gravity flow connection from said tank to said actuator, operating connections between said actuator and said indicator, and a gas pressure equalizing connection between the tank and said casing.

7. The combination with a tank, of means for registering the amount of liquid in said tank, comprising an indicator actuator of the Bourdon type located below said tank, a casing enclosing said actuator, a gravity flow connection from the bottom of said tank to said actuator, a pipe mounted on said casing, an indicator mounted on said pipe, and operating connections between said actuator and said indicator, including a cord extending through said pipe.

8. The combination with a tank, of means for registering the amount of liquid in said tank, comprising an indicator actuator of the Bourdon type located below said tank, a casing enclosing said actuator, a gravity flow pipe connecting the bottom of said tank with said actuator, a pipe mounted on said casing, an indicator mounted on said last-named pipe, operating connections between said actuator and said indicator including a cord extending through said last-named pipe, and a gas pressure equalizing pipe connecting the top of said tank with said casing.

CARL KNOBLOCH.

CERTIFICATE OF CORRECTION.

Patent No. 2,042,471. June 2, 1936.

CARL KNOBLOCH.

It is hereby certified that error appears in the above numbered patent requiring correction as follows: In the grant, and in the heading to the drawings and specification, title of invention, for "Liquid Level Gauge" read Liquid Volume Gauge; and that the said Letters Patent should be read with these corrections therein that the same may conform to the record of the case in the Patent Office.

Signed and sealed this 16th day of February, A. D. 1937.

(Seal)

Henry Van Arsdale
Acting Commissioner of Patents.